(12) United States Patent
Fellingham et al.

(10) Patent No.: US 8,472,923 B2
(45) Date of Patent: Jun. 25, 2013

(54) MONITORING MOBILE PHONE COMMUNICATIONS

(75) Inventors: Paul J. Fellingham, Holmdel, NJ (US); Christopher Gilboy, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1079 days.

(21) Appl. No.: 12/290,602

(22) Filed: Oct. 31, 2008

(65) Prior Publication Data

US 2010/0112986 A1 May 6, 2010
US 2013/0023246 A9 Jan. 24, 2013

Related U.S. Application Data

(63) Continuation of application No. 11/077,050, filed on Mar. 10, 2005, now abandoned.

(51) Int. Cl.
*H04M 3/42* (2006.01)

(52) U.S. Cl.
USPC ..... 455/414.1; 455/3.06; 455/3.04; 455/3.01; 455/458; 455/41.3; 455/404; 455/466; 455/419; 455/569

(58) Field of Classification Search
USPC ........... 455/406, 567, 456.1, 564, 566, 67.12, 455/3.06, 414.1; 379/49, 142.04, 142.06, 379/88.13, 114.14, 88.19, 8.26
See application file for complete search history.

(56) References Cited

U.S. PATENT DOCUMENTS

| | | | | |
|---|---|---|---|---|
| 6,345,180 B1 * | 2/2002 | Reichelt | ...................... | 455/404.1 |
| 6,785,515 B1 * | 8/2004 | Sommer et al. | ............ | 455/67.12 |
| 6,987,843 B1 * | 1/2006 | Barclay et al. | ........... | 379/100.06 |
| 7,046,782 B2 * | 5/2006 | Miller | ....................... | 379/207.14 |
| 7,298,835 B1 * | 11/2007 | Perry | ........................ | 379/210.02 |
| 2004/0203897 A1 * | 10/2004 | Rogers | ....................... | 455/456.1 |
| 2004/0208304 A1 * | 10/2004 | Miller | ....................... | 379/210.02 |
| 2005/0157858 A1 * | 7/2005 | Rajagopalan et al. | ..... | 379/93.23 |
| 2007/0041523 A1 * | 2/2007 | Paden et al. | ................ | 379/88.16 |
| 2007/0127639 A1 * | 6/2007 | Huang | ........................ | 379/88.13 |
| 2007/0230672 A1 * | 10/2007 | Carlson et al. | ............. | 379/93.35 |
| 2008/0113646 A1 * | 5/2008 | Cereceres et al. | ............ | 455/405 |
| 2008/0215961 A1 * | 9/2008 | Altberg et al. | ................ | 715/205 |
| 2008/0263460 A1 * | 10/2008 | Altberg et al. | ................ | 715/757 |
| 2009/0034705 A1 * | 2/2009 | Janssen | .................... | 379/142.06 |
| 2009/0168981 A1 * | 7/2009 | Johnson et al. | .......... | 379/114.14 |
| 2009/0290697 A1 * | 11/2009 | Adams | ..................... | 379/142.04 |
| 2009/0312067 A1 * | 12/2009 | Ahlin | ............................ | 455/567 |
| 2010/0105354 A1 * | 4/2010 | Huang | .......................... | 455/406 |

* cited by examiner

*Primary Examiner* — Joseph Arevalo

(74) *Attorney, Agent, or Firm* — Hartman & Citrin LLC

(57) ABSTRACT

The specification describes systems, and operation of systems, that allows a parent or other responsible party to monitor the mobile device activities of a child. In addition, it optionally allows the parent to dynamically control the mobile device activities of the child. It relies on software, or a network adjunct, that links a mobile device to a station set or mobile phone under the control of the parent. Calling traffic to and from the mobile device may be routed to a receiver at a location monitored by the parent. In preferred embodiments, software is designed to allow the parent to intervene in the communications of the child. The intervention may take a variety of forms, such as interrupting a call in progress, terminating all call activity, interrupting or terminating Internet access. Where the mobile device is provided with pre-programmed restraining software, the intervention may be to modify the restraining software to add new restraints.

12 Claims, 6 Drawing Sheets

Call Acceptance Flow

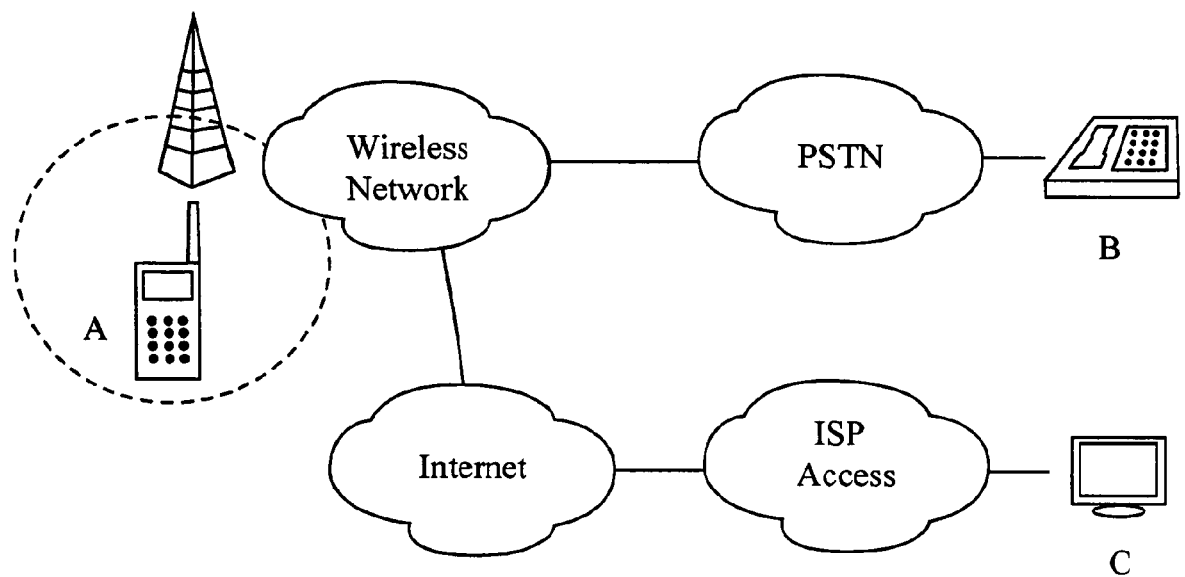
Figure 1 - Network Architecture

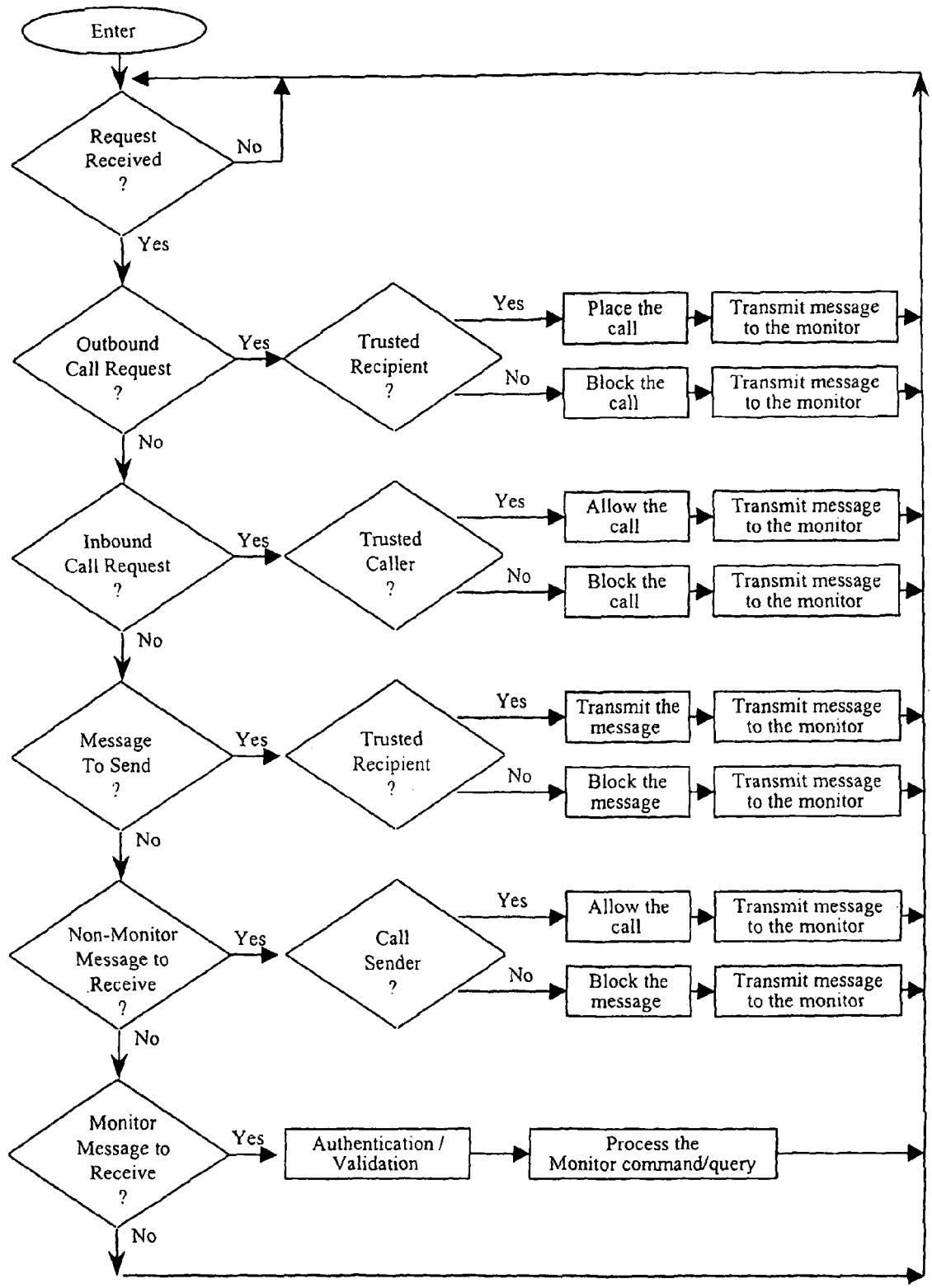
Figure 2 – Flow Logic

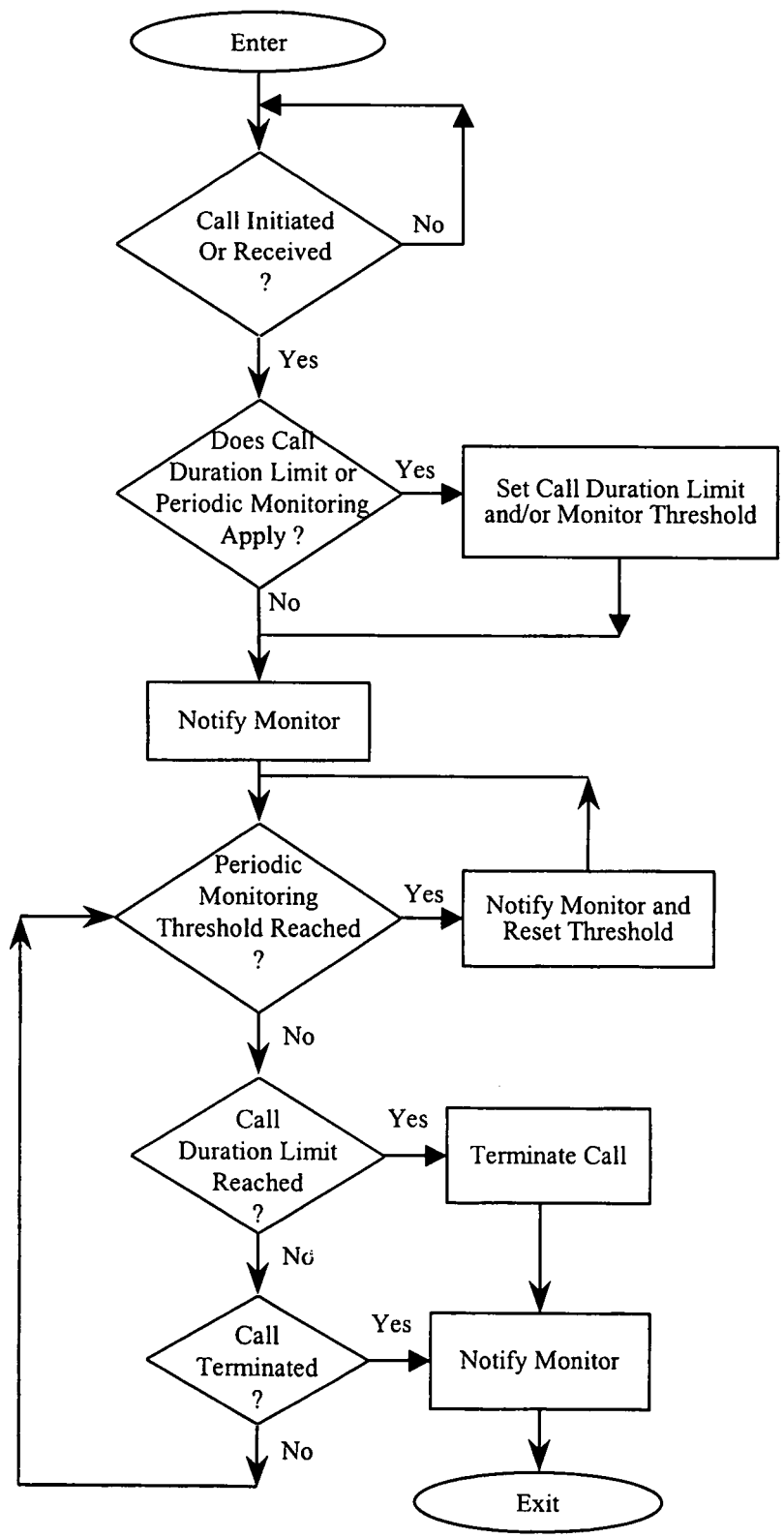
Figure 3 – Monitor Notification Flow

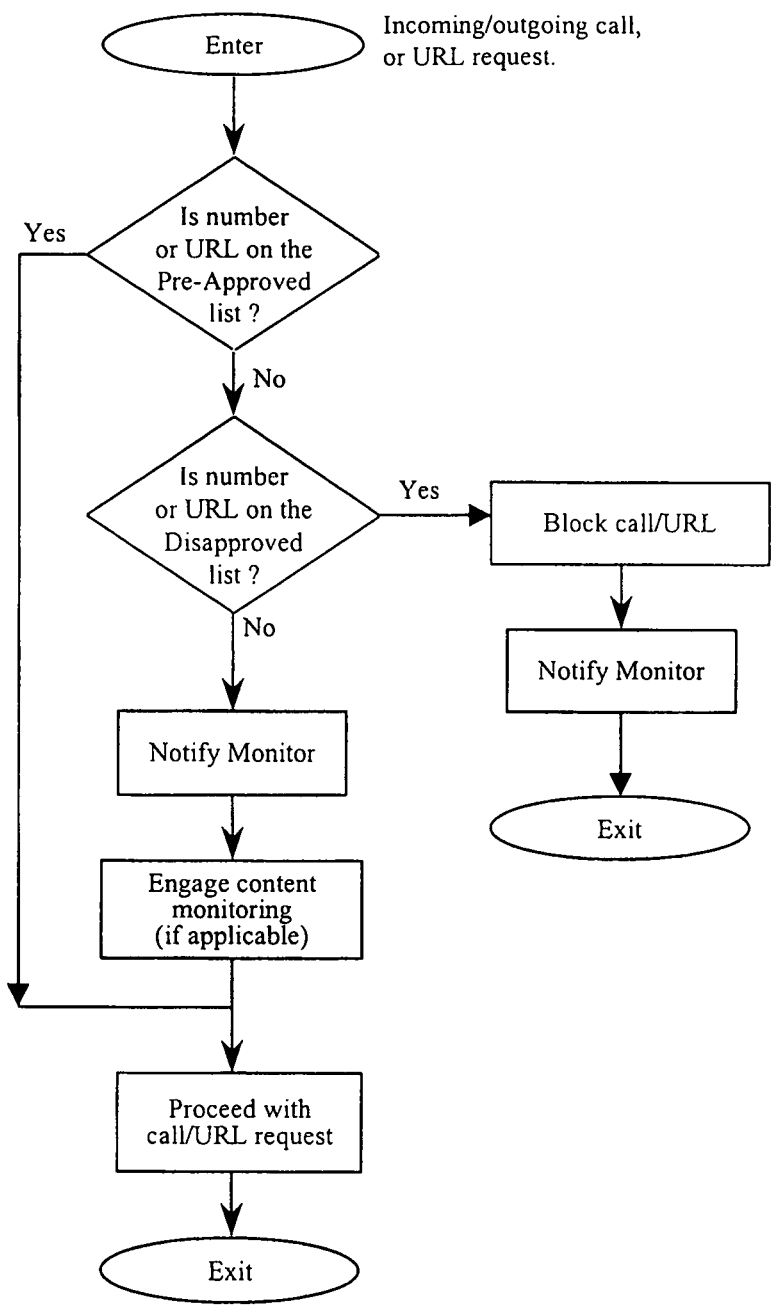
Figure 4 – Call Acceptance Flow

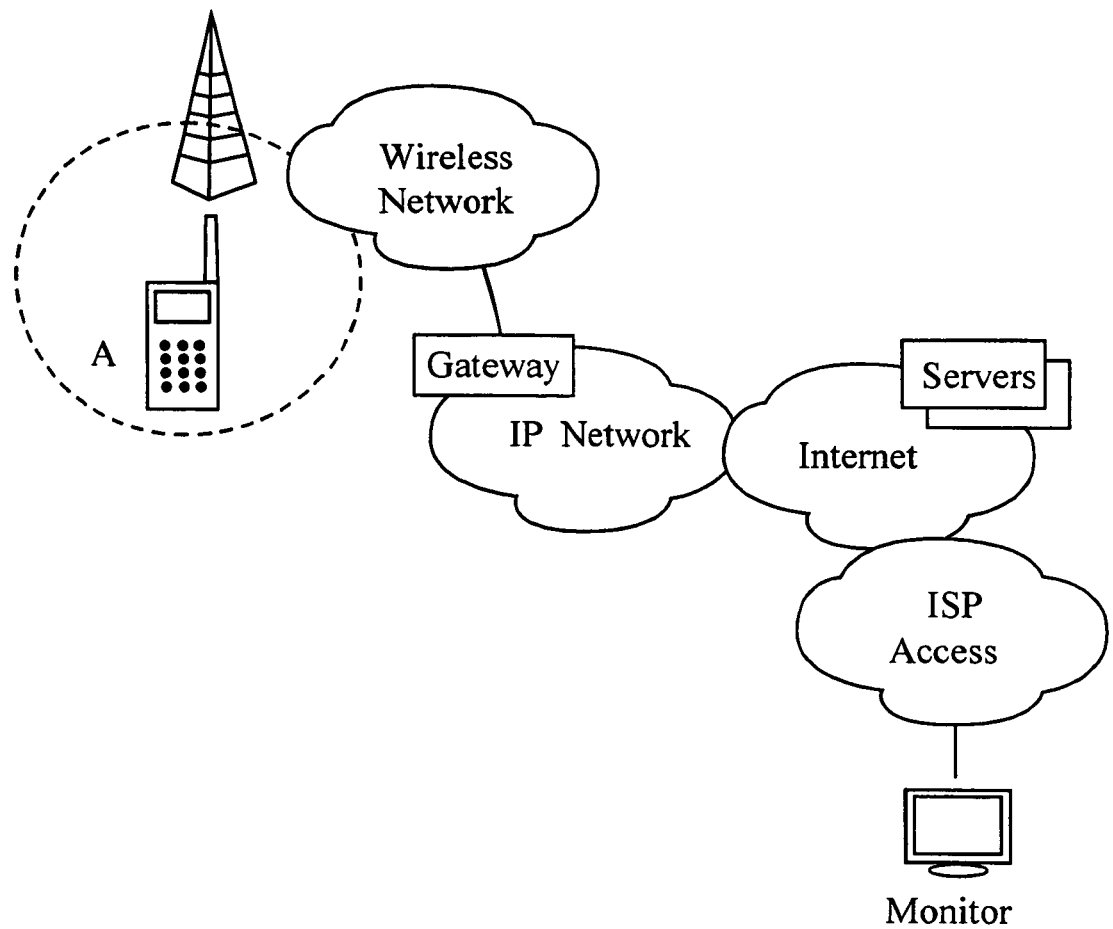
Figure 5 - Network Architecture

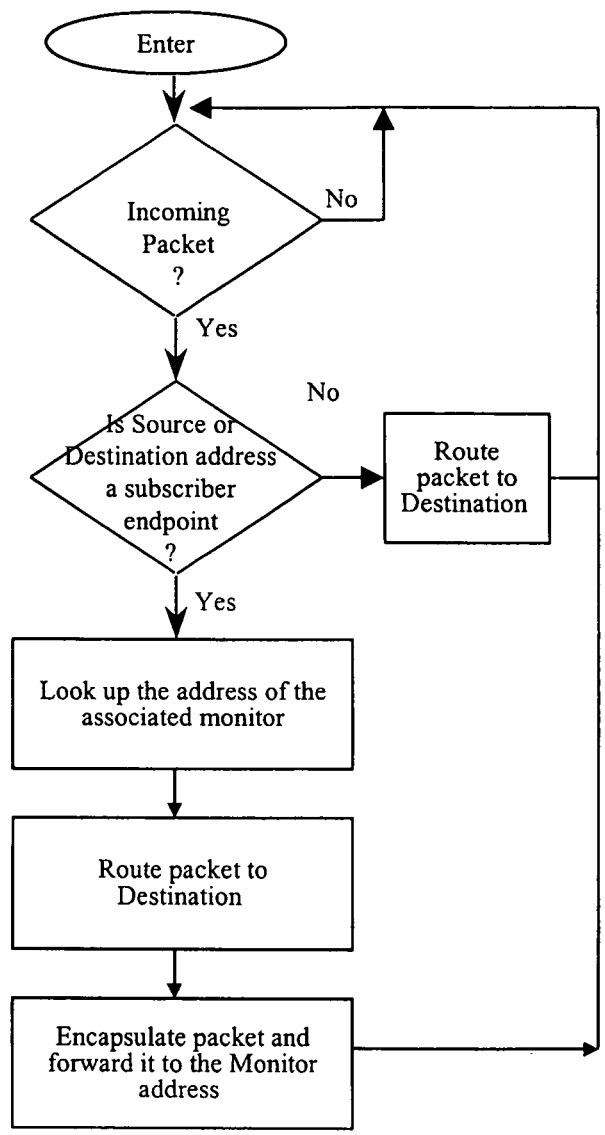
Figure 6 – Gateway Flow Logic

MONITORING MOBILE PHONE
COMMUNICATIONS

RELATED APPLICATION

This application is a continuation of U.S. application Ser. No. 11/077,050, filed Mar. 10, 2005, now abandoned, and entitled "Monitoring Mobile Phone Communications," which is expressly incorporated herein by reference in its entirety.

FIELD OF THE INVENTION

This invention relates to monitoring the calling activity and Internet activity of mobile device users. More specifically, it is directed to methods and systems for remotely monitoring and controlling the mobile device use of children.

BACKGROUND OF THE INVENTION

It is widely recognized that it is effective and important for parents or guardians to monitor the communications of children. The industry has developed a significant collection of tools that allow parents to monitor the telephone and Internet activities of children. To date these are mostly aimed at, and effective for, activities that occur in the home, or on premises controlled by the parents. These tools, for the most part, are ineffective for monitoring mobile phone activities. The so-called V-chip, and similar products, could be designed and implemented for mobile phones. But this approach requires a set of controls that are pre-programmed. A more desirable approach is one that allows dynamic monitoring of mobile device activities, as well as the option for controlling the mobile device activities from a remote location.

BRIEF STATEMENT OF THE INVENTION

We have designed systems, and operation of systems, that allow a parent or other responsible party to monitor the mobile device activities of a child. In addition, it optionally allows the parent to dynamically control the mobile device activities of the child. It relies on software, or a network adjunct, that links a mobile device to a station set or mobile phone under the control of the parent. Calling traffic to and from the mobile device may be routed to a receiver at a location monitored by the parent. In preferred embodiments, software is designed to allow the parent to intervene in the communications of the child. The intervention may take a variety of forms, such as interrupting a call in progress, terminating call activity, interrupting or terminating Internet access. Where the mobile device is provided with pre-programmed restraining software, the intervention may be to modify the restraining software to add new restraints.

The mobile device that is monitored may be a cell phone, a Wi-Fi device, or other mobile communications device. In the following description the party performing the monitoring may be a parent, guardian, or other authorized party, and will be referred to below as the Monitor, and the device used by the monitor, the monitor device. The monitor device is preferably a computer, but may be a land line phone, a wireless phone, a PDA, or other suitable device. The monitor device will typically reside on the premises of the Monitor, e.g., office or home, or it may be a mobile device. In the description below, the mobile communication device being monitored by the monitor will be referred to as the mobile device.

BRIEF DESCRIPTION OF THE DRAWING

The invention may be better understood when considered in conjunction with the drawing in which:

FIG. 1 is a schematic diagram of a network architecture for implementing the monitoring function of the invention;

FIGS. 2-4 show flow logic provided for the remote wireless device that is being monitored;

FIG. 5 is a schematic representation of a network architecture for implementing features of the monitor systems of the invention;

FIG. 6 is a flow diagram for gateway flow logic describing network implementation of the systems of the invention.

DETAILED DESCRIPTION OF THE INVENTION

With reference to FIG. 1, the basic network elements are shown schematically including remote mobile device A, and a wireless network. The mobile device communicates with the wireless network by any suitable mode, for example, cellular, Wi-Fi, GSM, Wi-Max. The wireless network is used to transmit/receive telephone calls to and from station set B via the Public Switched Telephone Network (PSTN). Station set B may be a wireless or wired communications device. The remote monitor device is shown at C and can be interconnected to the wireless device A using any of several options. In the case where the monitor is used to monitor telephone call activity, the monitor may be connected to the remote mobile device through the wireless network. Where the monitor is used to monitor Internet activity, the monitor may be connected to an internet access node serving the mobile device. The latter option is illustrated in FIG. 1, where the Internet and Internet access elements are shown.

FIG. 2 shows the overall control logic that resides within the mobile device A. This is basically a traffic flow management system and underlies the features to be described below. After powering up, the device waits for a message request. When a request is received, a series of conditional statements are used to determine the message type.

If the request is an "outbound call request," the logic checks to see if the device user is allowed to call the intended recipient. This is performed by checking either a "permitted call list" and/or a "denied caller list" in a local memory table. If the recipient is permitted, the logic will allow the call to be placed and a message will be sent to the monitor informing the monitor of the call and the associated information (start time, calling party number, etc.). If the recipient is not permitted, the call is blocked, the user receives a blocked message on the wireless device screen, and a message is sent to the monitor informing them of the blocked call (with the associated information).

If the request is an "inbound call request," the logic checks to see if the device user is allowed to receive a call from the caller. This is performed by checking either a "permitted call list" and/or a "denied caller list" in a local memory table. If the caller is permitted, the logic will allow the call to be received and a message will be sent to the monitor informing the monitor of the call and the associated information (start time, calling party number, etc.). If the caller is not permitted, the call is blocked, the user receives a blocked message on the wireless device screen, and a message is sent to the monitor informing them of the blocked call (with the associated information).

If the request is a "message to send request," the logic checks to see if the device user is allowed to send a message to the desired destination. This is performed by checking either a "permitted URL/user name list" and/or a "denied URL/user name list" in a local memory table. If the desired destination is permitted, the logic will allow the message to be placed and a message will be sent to the monitor informing the monitor of the message and the associated information (start time, desired destination, content, etc.). If the desired destination is not permitted, the message is blocked, the user receives a blocked message on the wireless device screen, and a message is sent to the monitor informing them of the blocked message (with the associated information).

If the request is a "non-monitor message to receive request," the logic checks to see if the device user is allowed to receive a message from the sender. This is performed by checking either a "permitted URL/user name list" and/or a "denied URL/user name list" in a local memory table. If the recipient is permitted, the logic will allow the message to be received and a message will be sent to the monitor informing the monitor of the message and the associated information (start time, sender, content, etc.). If the sender is not permitted, the message is blocked, the user receives a blocked message on the wireless device screen, and a message is sent to the monitor informing them of the blocked message (with the associated information).

If the request is a message from the Monitor, the logic authenticates and validates the message and then performs the requested function. This might include updating the policies, updating the filters, interrupting a call, etc.

The traffic flow control system just described controls call set up and message transfer for both telephone and internet traffic and is useful for implementing the service features described more specifically below.

FIG. 3 is a flow diagram for monitoring and controlling call duration. This is basically a toll management tool, and is useful for avoiding excessive cell phone usage. It should be understood that this service adjunct may be used alone, or in combination with other service features described herein. In the embodiment illustrated by FIG. 3, the Monitor is provided with the ongoing status of the call. The Monitor can request to be simply notified at the termination of the call, at which time a call termination notice and the call duration are provided to the Monitor. In addition, the Monitor can request that periodic status messages be sent while the call is in progress, such as every five minutes, every 30 minutes, etc. In this case, the Monitor may be afforded the opportunity to remotely terminate the call if the call is determined by the Monitor to have excessive duration. Furthermore, the aforementioned filtering capability may be extended to allow specific call types and/or calls to/from specific dialed numbers to be duration-limited. A simple case of this would allow a specific daily or monthly allotment of minutes to be applied to all calls, such that once the allotment is used up, any call in progress would terminate and no further calls would be allowed until the following day/month. A feature of the toll management service is the provision of a telephone number list for Emergency Calls. This is shown to the left of FIG. 3. Emergency call numbers may be 911, civil authorities (fire, police, etc.), as well as numbers (not necessarily emergency numbers) designated by the Monitor for unlimited access, such as home numbers, school numbers, telephone numbers of relatives, etc. This allows the mobile user, whose wireless service has been essentially terminated due to excess usage, to still have access to vital communications.

FIG. 3 shows an additional optional feature. An exemption is given from the toll management features to certain pre-assigned numbers. This allows those exempted numbers to have unlimited calls and call duration without invoking, or contributing to the threshold for invoking, any of the toll management features.

In addition to the wireless toll management system just described, the other main embodiment of the invention is content monitoring. Content monitoring may be implemented using the call acceptance logic flow shown in FIG. 4.

Implicit in this system is controlling call set-up, as well as controlling calls in progress. Control of call set-up uses a Pre-Approved call number list that is programmed into the mobile device. In a preferred modification of this system feature, the Pre-Approved call number list is under the control (remote control) of the Monitor. The Monitor may access and amend the Pre-Approved list as desired. The system of FIG. 4 may be used with the option just mentioned alone, or may be provided with an additional predetermined call number list of disapproved or prohibited numbers. In that case the logic shown in FIG. 4, and the call-blocking feature, is implemented. For telephone numbers that are not on either list, the system may rely on a real-time monitoring feature. When the mobile user attempts to set up a call to a number not on either list, the Monitor is automatically notified. After notification, the Monitor may choose to interrupt or terminate the call. It should be understood that FIG. 4 shows several options: control of call set-up using a Pre-Approved number list, control of call set-up using a Prohibited number list, control of call set-up using both a Pre-Approved and a Prohibited number list, monitoring calls in progress without intervention, monitoring calls in progress with intervention. Monitoring of telephone calls in progress is easily implemented using a standard conference bridge within the wireless network.

One, or any combination of the optional features just described should be considered within the scope of the invention.

FIG. 4 also illustrates content monitoring of Internet activity of the mobile user either from a mobile device (internet-enabled cell phone, PDA, etc.) or from a more traditional computing platform (PC, laptop, etc.). For initial access to a requested URL, the Pre-Approved and Prohibited lists may be used. For URLs not on either list, the Monitor would be notified of the unlisted URL and the Monitor can optionally initiate a multi-cast system that duplicates the Internet signal received by the mobile device. Alternatively, the Monitor can be notified of the URL only, and the Monitor can examine the content of that URL to determine whether intervention is necessary. Intervention could be to block further use of that URL for one time only, or the Monitor could access the prohibited (or allowed) URL or domain list and suitably modify the list.

In implementing any of these options, the Monitor may be given different levels of monitoring and control, such as a) total access (as illustrated above), b) partial monitoring (allows the monitor some control, but does not allow the monitor to read messages), c) monitor-only (allows monitoring, but no direct control).

In all these embodiments, the Monitor can be provided the ability to configure priority levels to the notifications. For example, calls that meet the filter criteria might have a low priority, whereas those that do not might have a high priority. Similarly, repeat visits to a previously used URL might have low priority, whereas visits to a previously unvisited URL might have high priority. Such prioritization would allow the Monitor to "ignore" low-priority events, yet be alerted to those events deemed a high priority.

The systems described in connection with FIGS. 3 and 4 may be used alone, or in any combination. The preferred embodiments of both of these systems have a common feature, i.e. the monitor has real time access to the mobile device. Also common to both systems is the provision of a telephone number, URL, or telephone number + URL, list that resides in the mobile device. For convenience, both telephone numbers and Internet URLs will be referred to below as "dialed addresses" and the lists just mentioned as "dialed address list(s)."

The real time access may take one or more of several forms. The address list is either under the unique control of the Monitor, with the ability to remotely control and modify the list, or the Monitor is provided with access to the address list. The Monitor is provided with real time unlimited access to the activity of the mobile device, i.e. duplicate content. The Monitor is provided with notification of activity events (call numbers, URLs). In each case the Monitor has a real time communication link with the mobile device. It is this link that allows effective monitoring, with or without intervention, of the communications activities of the mobile device user.

As mentioned, the Monitor may perform any one or more of the functions described here, in any combination. For example, Internet activity only may be monitored (where normal telephone calls are not monitored). This may be implemented by storing one or more Internet access numbers in the mobile device, and activating notification of the Monitor when an Internet access number is dialed. Upon notification of Internet access, the Monitor may intervene by one or more of the interventions described above. Included among potential interventions is transmitting Internet images to the Monitor device that duplicate Internet images transmitted to the mobile device. If the dialed number is an allowed Internet access number, any subsequent dial address (URL) that is entered in the mobile device may be compared with a stored Allowed/Prohibited URL list for allowing or blocking the URL entered. In this embodiment, i.e. Internet monitoring only, the list referred to in FIG. 4 may contain URLs only.

An example of how the services just described can be implemented in a wireless network environment is shown in FIGS. 5 and 6. FIG. 5 shows a network architecture. The mobile device A is within wireless network coverage. A router (labeled "Gateway") is used to analyze datagrams that travel to and from the wireless device. The wireless service provider maintains an IP network, which connects to the world via the Internet (i.e., the capital "I" of internet). The monitor device is also connected to the Internet via ISP access (which may be broadband, dial-up, wireless, etc.).

FIG. 6 shows the flow logic for the gateway router. Basically, the gateway waits for incoming packets. When a packet arrives, the gateway looks at the destination and source IP address to see if the packet is coming from or going to a monitored mobile device. If this is the case, the gateway looks into a cache table or data base to determine the IP address for the associated monitoring device. The packet is then routed to two places. First it is routed to the destination device as usual. Second, the packet is encapsulated into a special message and forwarded to the monitor. These special messages provide the monitor with the URLs and messages being transferred to and from the mobile device.

At the monitor, the mobile device information can be displayed in various ways. For example, the monitor can list the URLs for the monitoring person to review. Filters can be used to help the monitoring person consume the data more easily. In another example, the monitor can display the contents of the URLs so that the subscriber can monitor the same content that the mobile device is receiving. If the monitoring person decides that they would like to block the content, the monitoring person can enter a request to the gateway that the URL be blocked for the associated mobile device.

Reference made herein to placing a call or dialing a telephone number may involve entering a conventional sequence of dialed numbers or may, alternatively, involve entering a dial number code into an automatic preprogrammed dialer. These are considered equivalent in the context of "entering a dialed number".

Reference to amending a dialed number list or a called number list means changing the dialed number list by adding, removing, updating, or otherwise changing the content of the list.

Reference to "remote" in describing the location of the monitor device with respect to the mobile device means that the two devices are not on the same premises. Operating the monitor device to implement the monitor functions described here using a wireless network would normally mean that the two devices are not physically co-located.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Method for placing and receiving calls between a mobile device controlled by a first party and a wireless network, the mobile device containing control logic, and a monitor device remotely connected to the wireless network, the method comprising:
 a) entering a dialed call address in the mobile device,
 b) using the control logic comparing the dialed call address to a dialed call address list stored in the mobile device,
 c) placing a call only when the dialed call address is on the stored dialed call address list,
 d) entering a received call address in the mobile device,
 e) using the control logic comparing the received call address to a received call address list stored in the mobile device,
 f) timing the duration of the calls placed to generate a total call duration, when the total call duration reaches a predetermined value,
 g) blocking a call when the received call address is not on the stored received call address list,
 h) placing a call over the wireless network between the mobile device and the a remote monitor,
 i) receiving by the remote monitor a request from the first party to amend a call address list,
 j) sending from the remote monitor to the mobile device over the wireless network a message to amend the call list,
 k) using the control logic in the mobile device to authenticate the message, and, if authenticated, to amend the call list.

2. The method of claim 1 wherein calls are simultaneously routed to the mobile device and to the remote monitor.

3. The method of claim 2 wherein the remote monitor intervenes in a call in progress.

4. The method of claim 3 wherein the intervention is to listen to a call in progress.

5. The method of claim 3 wherein the intervention is to terminate a call in progress.

6. The method of claim 1 wherein the call address is a telephone number.

7. The method of claim 1 wherein the call address is an Internet access number.

8. The method of claim 1 wherein the call address is an Internet URL.

9. Method for placing calls between a mobile device and a wireless network comprising:
 a) placing calls between the mobile device and the wireless network,
 b) timing the duration of the calls placed to generate a total call duration, when the total call duration reaches a predetermined value restricting further calls by:

c) entering a dialed number in the mobile device, d) comparing the dialed number to a dialed number list stored in the mobile device, e) receiving by a remote monitor a request from the first party to amend a call address list, f) sending from the remote monitor to the mobile device over the wireless network a message to amend the call list, g) using a control logic in the mobile device to authenticate the message, and, if authenticated, to amend the call list, h) placing a call only if the dialed number that matches a dialed number on the stored dial number list.

10. The method of claim 9 wherein the dialed number list is amended using a monitor device connected to the wireless network.

11. The method of claim 9 wherein calls placed by the mobile device are compared with a call address list to determine whether an exemption applies, and applying step b) selectively to calls for which an exemption does not apply.

12. Method for placing and receiving calls between a mobile device controlled by a first party and a wireless network, the mobile device containing control logic, comprising:

a) entering a dialed call address in the mobile device, b) using the control logic comparing the dialed call address to a dialed call exemption list stored in the mobile device, c) using the control logic timing the duration of the calls placed that are not on the dialed call exemption list to generate a total call duration, when the total call duration reaches a predetermined value:

d) entering a dialed number in the mobile device, e) comparing the dialed number to a dialed number list stored in the mobile device, f) receiving by the remote monitor a request from the first party to amend a call address list, g) sending from the remote monitor to the mobile device over the wireless network a message to amend the call list, h) using the control logic in the mobile device to authenticate the message, and, if authenticated, to amend the call list, i) placing a call that matches a dialed number on the stored dial number list.

* * * * *